United States Patent [19]

Sakino et al.

[11] Patent Number: 5,228,358

[45] Date of Patent: Jul. 20, 1993

[54] MOTION GUIDING DEVICE

[75] Inventors: Shigeo Sakino; Eiji Osanai, both of Yokohama, Japan

[73] Assignee: Canon Kabushiki Kaisha, Tokyo, Japan

[21] Appl. No.: 991,711

[22] Filed: Dec. 16, 1992

Related U.S. Application Data

[63] Continuation of Ser. No. 658,237, Feb. 20, 1991, abandoned.

[30] Foreign Application Priority Data

Feb. 21, 1990 [JP] Japan ................... 2-038410

[51] Int. Cl.⁵ .................................... A47B 1/10
[52] U.S. Cl. .................... 74/479 R; 108/143; 108/20; 384/12; 384/902
[58] Field of Search .............. 74/479; 108/143, 20; 384/12, 902

[56] References Cited

U.S. PATENT DOCUMENTS

| | | | |
|---|---|---|---|
| 3,272,568 | 9/1966 | Koorneef et al. | 384/12 X |
| 3,475,065 | 10/1969 | Weichsel | 384/12 |
| 3,476,444 | 11/1969 | Duntee | 384/12 |
| 3,563,186 | 2/1971 | Piper et al. | 108/143 |
| 3,744,858 | 7/1973 | Weichsel | 384/12 |
| 4,417,770 | 11/1983 | Tucker | 384/12 |
| 4,648,723 | 3/1987 | Sugiyama et al. | 384/12 X |
| 4,653,408 | 3/1987 | Nagashima et al. | 384/12 X |
| 5,040,431 | 8/1991 | Sakino et al. | 74/479 |

FOREIGN PATENT DOCUMENTS

| | | |
|---|---|---|
| 291119 | 11/1988 | European Pat. Off. . |
| 1575396 | 9/1969 | Fed. Rep. of Germany ........ 384/12 |
| 61-209831 | 3/1985 | Japan . |
| 62-088526 | 4/1987 | Japan . |
| 62-88526 | 4/1987 | Japan . |
| 63-232912 | 9/1988 | Japan . |

Primary Examiner—Allan D. Herrmann
Assistant Examiner—William O. Trousdell
Attorney, Agent, or Firm—Fitzpatrick, Cella, Harper & Scinto

[57] ABSTRACT

A motion guiding device includes a first movable member movable in a first direction, a second movable member movable in a second direction different from the first direction and for guiding motion of the first movable member in the first direction through a gas pressure, a base for supporting the first and second movable members independently of each other, with respect to a vertical direction through cooperation of a gas pressure. In addition, a guide is fixed to the base for guiding motion of the second movable member in the second direction through cooperation of a gas pressure and a magnetic force of a permanent magnet, a first linear motor moves the first movable member in the first direction, relative to the second movable member, and a second linear motor moves the second movable member with the first movable member in the second direction.

4 Claims, 6 Drawing Sheets

MOTION GUIDING DEVICE

This application is a continuation of application Ser. No. 07/658,237 filed Feb. 20, 1991, now abandoned.

FIELD OF THE INVENTION AND RELATED ART

This invention relates to a motion guiding device and, more particularly, to a motion guiding device for quickly and precisely positioning, at a desired position, a movable member such as an X stage or a Y stage, for example, in a semiconductor device manufacturing apparatus or a precision machining instrument, etc.

Many proposals have been made in respect to a motion guiding device for moving a movable member along a predetermined guide and for positioning it at a desired position with high precision.

Figure 7:
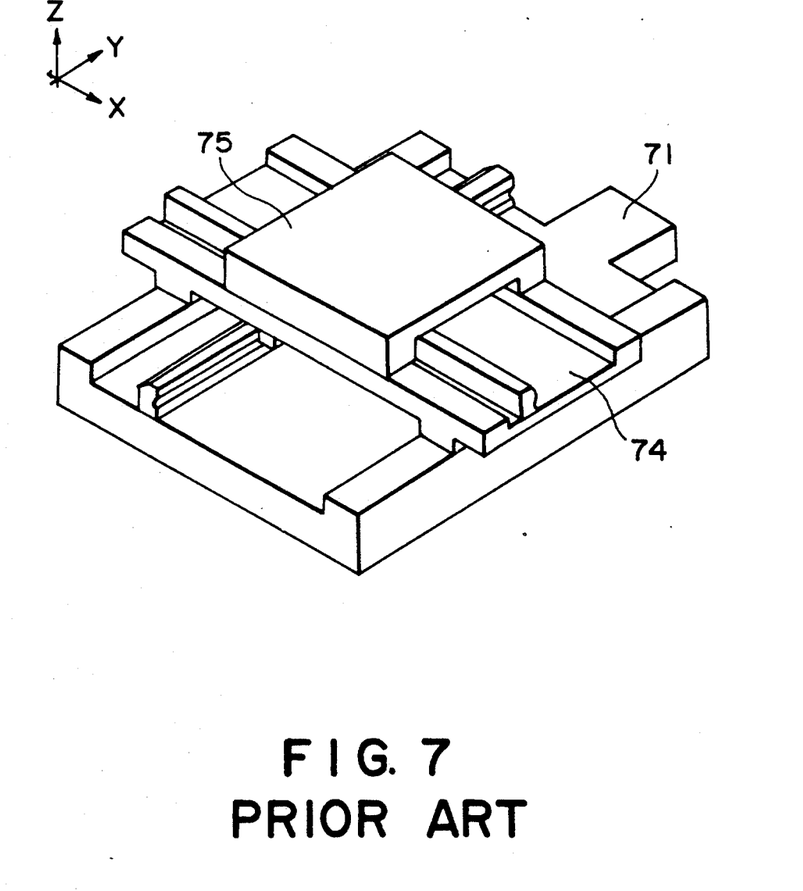
FIG. 7 is a perspective view of a known type X-Y stage mechanism.

FIG. 7 is a perspective view of a major part of a known type motion guiding device having X and Y moving mechanisms.

Denoted in this Figure at 71 is a base plate on which a Y stage (Y-axis direction moving mechanism) 74 is placed. On this Y stage 74, an X stage (X-axis direction moving mechanism) 75 is placed.

The X stage 75 and the Y stage 74 can be moved in predetermined directions by driving means (not shown) such as linear motors, for example.

Since the motion guiding device of the type shown in FIG. 7 has an accumulative structure wherein the base plate 71, the Y stage 74 and the X stage 75 are laid accumulatively in this order, there is a disadvantage of a large height in the vertical (Z-axis) direction.

Figure 8A:
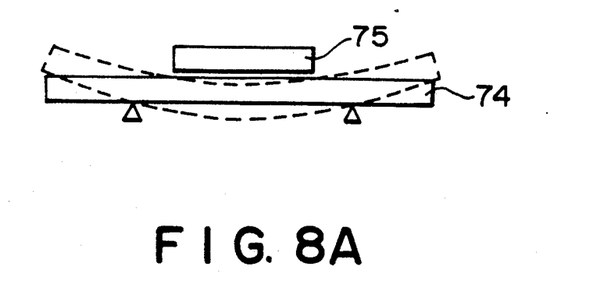
FIGS. 8A and 8B are schematic views, for explaining in conveniences involved in the prior art.
Figure 8B:
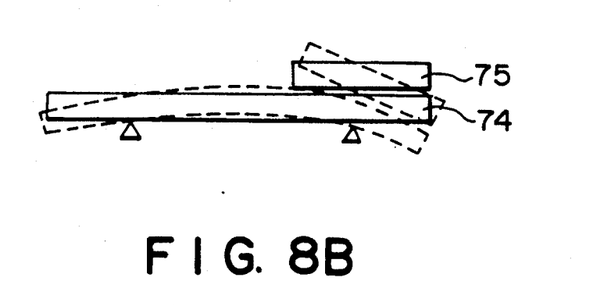

Further, as the X stage 75 moves, an unbalanced load is applied to the Y stage 74, and the Y stage 74 deforms such as depicted by broken lines in FIGS. 8A and 8B, for example. This results in deterioration of static attitude precision of the X stage 75.

Figure 9:
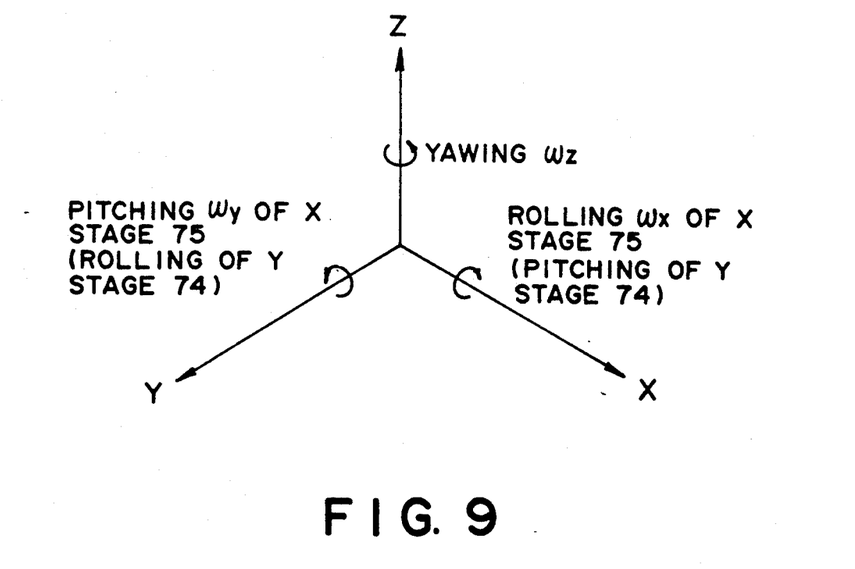
FIG. 9 illustrates vibration modes.

Further, where the X stage 75 and the Y stage 74 are provided by rigid members, these stages have six degrees of freedom as depicted in FIG. 9, and all degrees of freedom six freedoms are coupled to each other (for example, pitching of the Y stage 74 results in creation of rolling of the X stage 75). Thus, the attitude precision is deteriorated dynamically.

In Japanese Laid-Open Patent Application No. 62-88526, an X-Y moving mechanism with static pressure guide has been proposed. In this type of structure, however, unless all the base plate and the stages are made of the same material, a temperature change during the stage movement, if any, causes a change in the gap between bearing means and guide means which change in turn causes a change in the control characteristic and prohibits smooth positioning operation. Also, in an environment such as under transportation, for example, wherein large temperature changes occur, there is a high possibility that, due to thermal expansion or the like, the gap between the bearing means and the guide means reduces to cause damage of the static-pressure bearing means, the stage or the base plate.

SUMMARY OF THE INVENTION

The inventors of the subject application, in cooperation with other joint inventors, have proposed an improved motion guiding device with X and Y stages guided by static-pressure bearing means, in U.S. patent application Ser. No. 299,340, filed Jan. 23, 1989, now U.S. Pat. No. 5,040,431. In one aspect, the present invention pertains to this type of motion guiding device. Thus, in one aspect, it is an object of the present invention to provide a motion guiding device with additional improvements.

More specifically, it is an object of the present invention to provide a motion guiding device in which guiding mechanisms for an X stage and a Y stage are set appropriately to the motion of these stages so as to eliminate a moving load of the Y stage, for example, to thereby avoid deterioration of the static attitude precision of the X stage and to assure high-precision positioning.

It is a further object of the present invention to provide a motion guiding device by which, with regard to motion of the Y stage, for example, correlation of vibrations in three components, i.e., in a direction perpendicular to the moving direction of the Y stage, in a vertical direction and the rolling, is intercepted and, additionally, transmission of pitching of the Y stage to the X stage is blocked or suppressed, whereby high-precision positioning is assured.

It is a yet further object of the present invention to provide a motion guiding device by which, even if a temperature change occurs during transportation or use of the same, damage of a stage or a change in control characteristic can be prevented to thereby assure high-precision positioning.

In accordance with an aspect of the present invention, to achieve such an object, a motion guiding device includes a base plate having a reference surface, a first movable member slidably movable along the reference surface of the base plate in a first direction, and a second movable member mounted for slidable movement in a second direction perpendicular to the first direction, wherein the weights of both the first and second movable members are supported by the base plate.

As an example, the base plate may be made of a magnetizable material such as, for example, alloy tool steel, carbon steel or carbon tool steel, and, on this base plate, a single stationary guide made of a similar magnetizable material may be mounted. The first movable member may be supported, with respect to the stationary guide and the base plate, through a static-pressure gas bearing means and a magnet attracting means, so as to be moved in parallel to the stationary guide. The second movable member may be supported through a static-pressure gas bearing means, with respect to the first movable member while, on the other hand, it may be supported, with respect to the base plate, through a static-pressure gas bearing means and a magnet attracting means, so as to be moved in a direction perpendicular to that of the first movable member.

The guiding of the first movable member may be provided by the single stationary guide mounted on the base plate, and the guiding of the same in the vertical direction may be provided by the base plate. The guiding of the second movable member in a lateral direction may be provided by the first movable member, and the guiding of the same in a vertical direction may be provided by the base plate.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

FIGS. 1-5 schematically illustrate a general structure of a first embodiment of the present invention.

Figure 1:
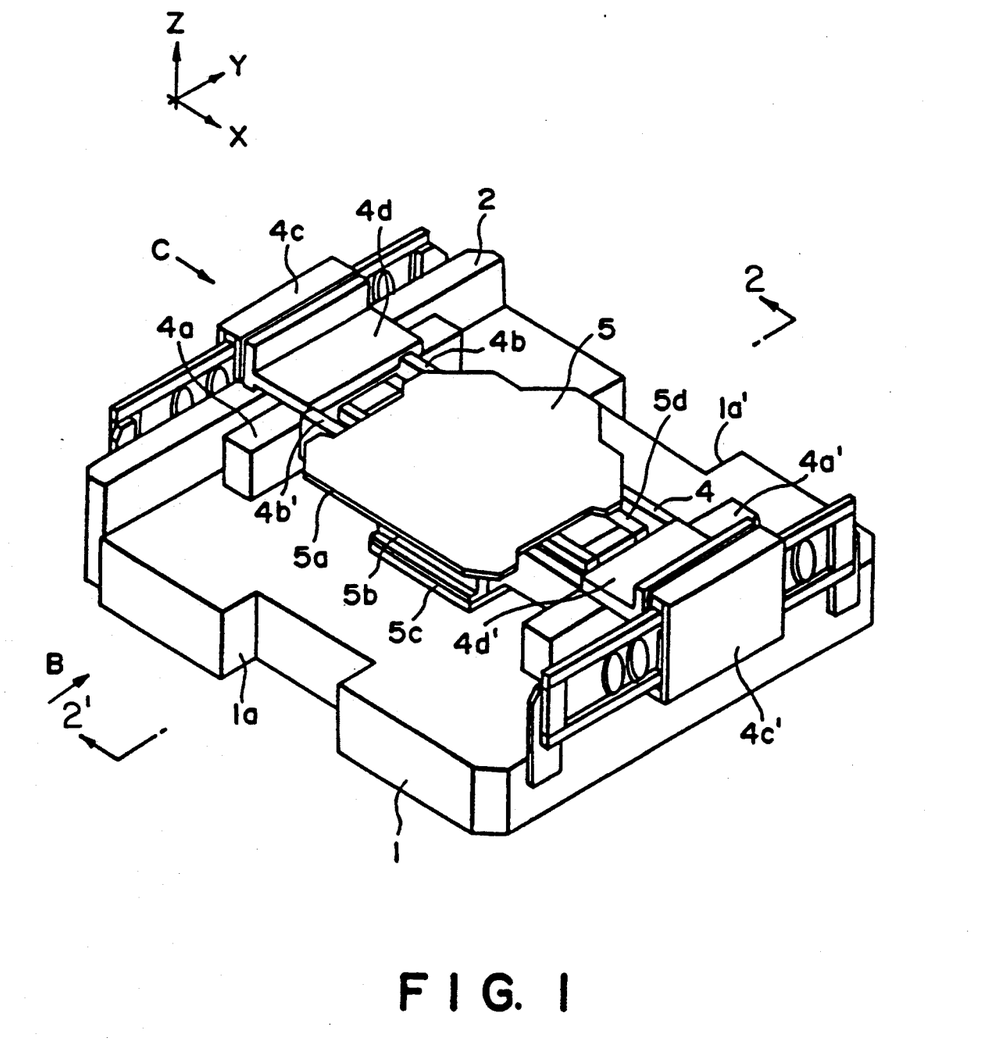
FIG. 1 is a perspective view of a motion guiding device according to a first embodiment of the present invention.
Figure 2:
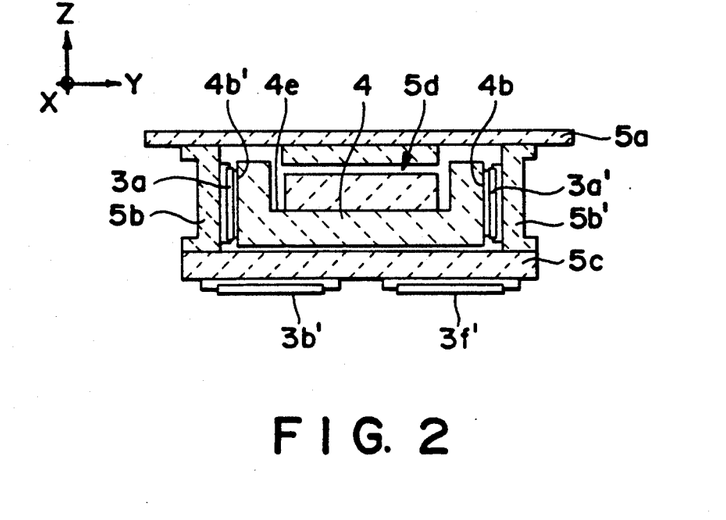
FIG. 2 is a sectional view taken on a line 2—2' in FIG. 1.
Figure 3:
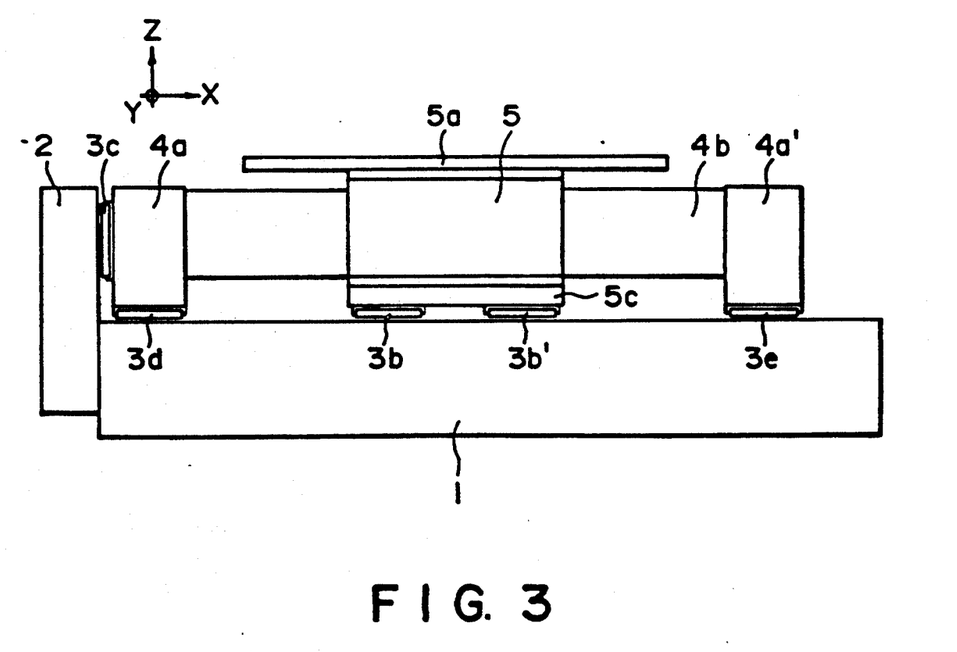
FIG. 3 is a side view, as seen in the direction of an arrow B in FIG. 1.
Figure 4:
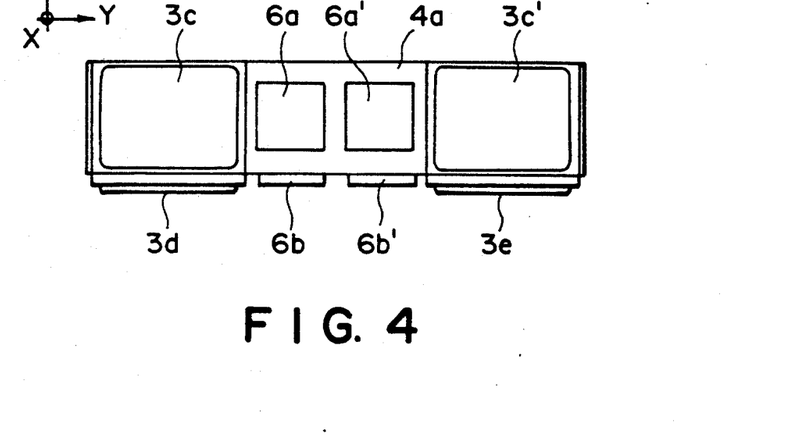
FIG. 4 is a side view, as seen in the direction of an arrow C in FIG. 1.
Figure 5:
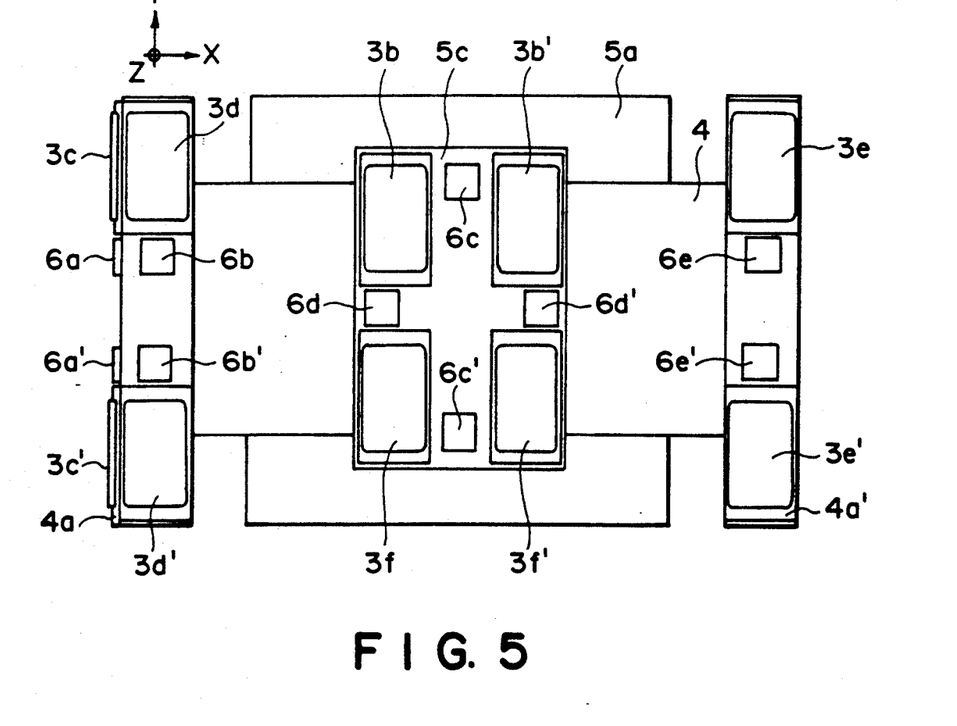
FIG. 5 is a bottom view of the motion guiding device of the FIG. 1 embodiment.

FIG. 1 is a perspective view. FIG. 2 is a sectional view taken on a line 2—2' in FIG. 1. FIG. 3 is a side view as seen in the arrow B direction in FIG. 1. FIG. 4 is a side view as seen in the arrow C direction in FIG. 1. FIG. 5 is a bottom view of the FIG. 1 device In these drawings, Z axis extends vertically while X and Y axes extend horizontally.

Denoted at 1 is a base plate made of a magnetizable material and having a smooth upper surface (reference surface) The reference surface is substantially parallel to the X-Y plane Denoted at 1a and 1a' are recesses provided for maintenance of bearing means. Denoted at 4 is a Y stage (movable member), and denoted at 5 is an X stage (movable member). Denoted at 2 is a stationary guide fixedly secured to a side surface of the base plate 1. The stationary guide 2 serves to guide the motion of the Y stage 4 in the Y-axis direction (horizontal direction), and it is made of the same magnetizable material as the base plate 1. Denoted at 3a-3f and 3a'-3f are static-pressure gas bearings each comprising a pad of porous material. The bearings 3a and 3a' serve to guide the motion of the X stage 5 in the X-axis direction along the Y stage 4 and to confine displacement of the same with respect to the Y-axis direction. The bearings 3b, 3b', 3f and 3f serve to support the X stage 5 with respect to the reference surface of the base plate 1 and in the Z-axis direction (vertical direction). The bearings 3c and 3c' serve to guide the motion of the Y stage 4 in the Y-axis direction along the stationary guide 2. The bearings 3d, 3d', 3e and 3e' serve to support the Y stage 4 with respect to the reference surface of the base plate 1 and in the Z-axis direction.

Denoted at 4a and 4a' are mounting plates for the static-pressure gas bearings, and denoted at 4b and 4b' are guides for the motion of the X stage 5 in the X-axis (horizontal) direction. These guides 4b and 4b' are provided at opposite sides of the Y stage 4, as best seen in FIG. 2. The bearings 3c and 3c' are mounted to a surface of the mounting plate 4a, facing the stationary guide 2. The bearings 3d and 3d' are mounted to another surface of the mounting plate 4a, facing the base plate 1. The bearings 3e and 3e' are mounted to a surface of the mounting plate 4a', facing the base plate 1.

Denoted at 4c and 4c' are drive actuators for the Y stage 4. For example, these actuators comprise moving magnet type linear motors and are disposed at the opposite sides of the Y stage. Denoted at 4d and 4d' are coupling plates for fixedly coupling the Y stage 4 and the drive actuators 4c and 4c' (to be exact, moving parts of them). The coupling plate 4d is fixed to the static-pressure gas bearing mounting plate 4a, while the coupling plate 4d' is fixed to the other static-pressure gas bearing mounting plate 4a'. Stationary parts of the drive actuators 4c and 4c' are fixedly secured to the base plate 1. Denoted at 5a is a movable plate of the X stage 5; denoted at 5b and 5b' are bearing mounting plates on which the bearings 3a and 3a' for supporting and guiding the X stage 5 in the horizontal direction are mounted; denoted at 5c is a bearing mounting plate which is fixed to the bearing mounting plates 5b and 5b' and on which the bearings 3b, 3b', 3f and 3f for supporting and guiding the X stage 5 in the vertical direction are mounted; and denoted at 5d is a drive actuator for the X stage 5 which comprises a moving magnet type linear motor, for example. The drive actuator 5d has a stationary part fixed to a recess 4e of the Y stage 4 and a movable part fixed to the movable plate 5a.

Denoted at 6a–6e and 6a–6e' are pre-loading magnet units each comprising a pre-loading mechanism such as, for example, disclosed in Japanese laid-Open Patent Application No. 63-232912, as having a permanent magnet (magnetic force means) and yokes provided at the opposite sides thereof. Such a pre-loading mechanism is effective, when a pressurized fluid is supplied to a static-pressure bearing to float a movable member, to prevent inclination of the movable member due to variation in the bearing characteristic, by means of the magnetic force acting in the opposite direction to the floating force provided by the bearing, and thereby to maintain constant attitude.

In this embodiment, the drive actuators 4c, 4c' and 5d may comprise hydraulic DC motors, for example, in place of linear motors.

In the present embodiment, in response to supply of gases from a supply source (not shown) to the static-pressure gas bearings 3d, 3d', 3e and 3e', the Y stage 4 floats from the base plate 1. Also, in response to supply of gases to the bearings 3c and 3c', the Y stage 4 floats from the stationary guide 2. In this state, the Y stage 4 can be moved in the Y-axis direction along the stationary guide 2 by means of the two drive actuators 4c and 4c'.

Also, in response to supply of gases to the static-pressure gas bearings 3b, 3b', 3f and 3f, the X stage 5 floats from the base plate 1, similarly to the Y stage 4. Also, in response to supply of gases to the bearings 3a and 3a', the X stage 5 floats from the guides 4b and 4b', and it can be moved in the X-axis direction by means of the drive actuator 5d, while being guided in the X-axis direction by the guides 4b and 4b' mounted to the side surfaces of the Y stage 4. Here, under the influence of the pre-loading magnet units 6a–6e and 6a'–6e', the X stage 5 and the Y stage 4 are adjusted to maintain constant attitude with respect to the reference surface of the base plate 1 and the guiding surface of the stationary guide 2. The magnet units 6a and 6a' are mounted on a side of the mounting plate 4a so as to be opposed to the guiding surface of the stationary guide 2, and they apply magnetic forces to the stationary guide 2 so as to attract the Y stage 4 to the stationary guide 2 in respect to the X-axis direction. The magnet units 6a and 6a' are disposed between the bearings 3c and 3c'. The magnet units 6b, 6b', 6e and 6e' are mounted on the bottom surfaces of the mounting plates 4a and 4a' so as to be opposed to the reference surface of the base plate 1, and they apply magnetic forces to the base plate 1 so as to attract the Y stage 4 to the base plate 1 in respect to the Z-axis direction. The magnet units 6c, 6c', 6d and 6d' are mounted on the mounting plate 5c so as to be opposed to the reference surface of the base plate 1, and they act on the X stage 5 in the same manner as the magnet units 6b, 6b', 6e and 6e' act on the Y stage 4.

Important features of the present embodiment are as follows:

(a) The guide of each of the X stage and the Y stage in a vertical direction (Z-axis direction) is made by the base plate 1, such that the movement of one of the X stage and the Y stage does not produce a moving load applied to the other stage Thus, the static attitude can be retained satisfactorily.

(b) The vibration coupling between the X stage and the Y stage with respect to three components, i.e. in a longitudinal direction (X direction in FIG. 1), a perpendicular direction (Z direction in FIG. 1) and rolling (rotation about the y-axis in FIG. 1), can be completely intercepted.

(c) Any pitching of the Y stage (rotation thereof about the X-axis in FIG. 1) may be transmitted to the X stage only through the gas bearing means 3a and 3a'. Therefore, the coupling between the Y stage and the X stage with respect to the pitching of the Y stage is suppressed to a minimum.

(d) The device may be structured so that the carrying table 5a overhangs the stationary guide 2 or the Y stage driving actuators 4c with respect to the X-axis direction. By doing so, the area to be occupied by the base plate 1 is kept as small as that in conventional devices.

(e) The height of the movement guiding device as a whole, including that of the base plate 1, can be reduced to about a half of that of the conventional devices.

(f) By adjusting the height of the coupling plates 4d and 4d', it is possible that the point of drive for the Y stage substantially coincides with the center of gravity of the whole X-Y stage mechanism, with respect to the height direction (Z-axis direction). This is very effective to minimize the occurrence of vibration upon the driving of the Y stage.

(g) The length of each gas bearing mounting plate 4a or 4a' of the Y stage 4, in the Y-axis direction, is made equal to the length of the movable plate 5a of the X stage 5 with respect to the Y-axis direction. By this, unpreferable increase in the movable area for movement of the movable plate 5a, can be prevented.

(h) The base plate 1, the stationary guide 2 and the Y stage 4 (X stage 5) can be made of different materials having different thermal expansion coefficients. As an example, the base plate 1 and the stationary guide 2 can be made of a magnetizable material for the magnet preloading, while the Y stage 4 and the X stage 5 can be made of a material such as ceramic, for example, for reduction in weight and increase in rigidity. Since only a single stationary guide 2 is used and only one surface is used as a reference, any temperature difference does not cause a change in the characteristic.

(i) The provision of recesses 1a and 1a' in the base plate 1 assures easy cleaning if foreign particles enter the clearance below the static pressure bearing mounting plate 5c in the vertical (Z-axis) direction of the X stage 5, by moving the X stage 5 to the recess 1a or 1a'.

(j) By making the horizontal bearing mounting plate 5b (5b') of the X stage 5 into a channel shape such as shown in FIG. 2, the area of contact of it to the movable plate 5a and the mounting plate 5c increases, resulting in enhanced reliability of the coupling portion to slip.

Figure 6:
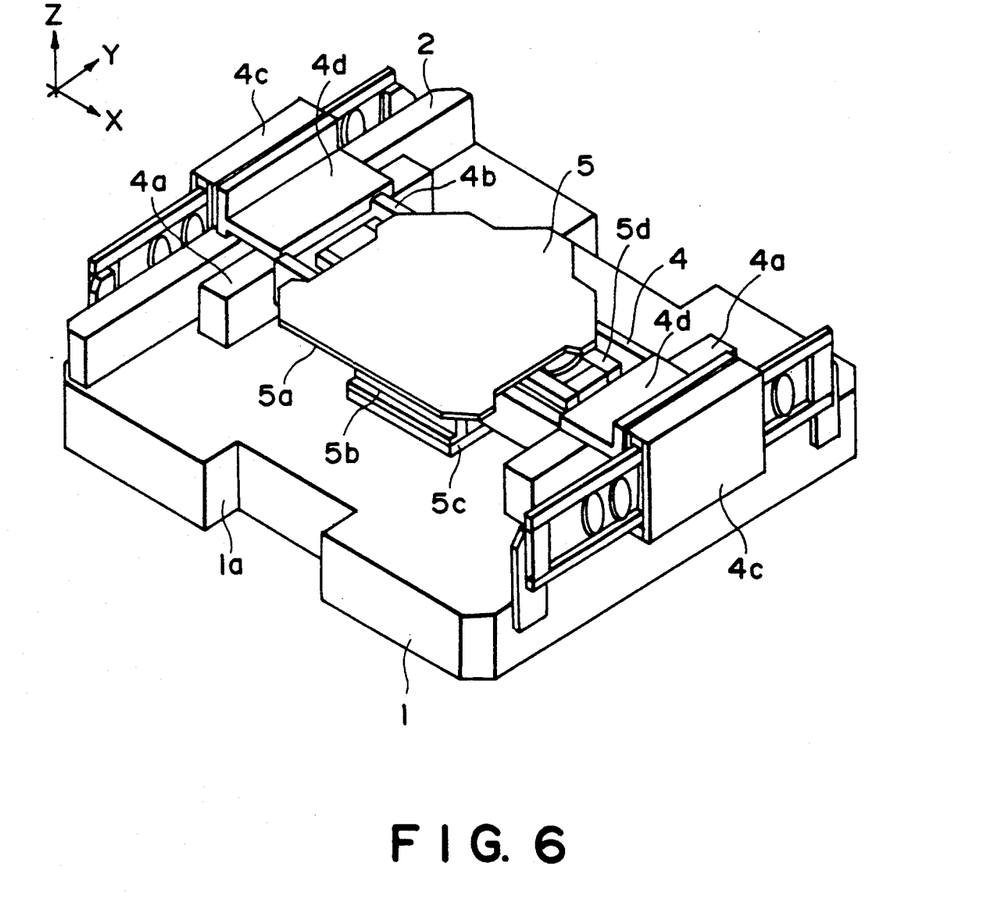
FIG. 6 is a perspective view of a motion guiding device according to a second embodiment of the present invention.

(k) Since the stationary guide 2 is mounted laterally to the side surface of the base plate 1, it does not shift laterally. FIG. 6 is a perspective view of a second embodiment of the present invention. In this embodiment, like numerals are assigned to the elements corresponding to those of the first embodiment.

In this embodiment, the stationary guide 2 is mounted on the upper surface (reference surface) of the base plate 1 by fixing means (not shown) such as bolts, adhesion or the like. Except for this point, the structure of this embodiment is the same as the FIG. 1 embodiment.

In addition to the advantageous features (a)–(j) of the first embodiment, the present embodiment provides the following advantages:

(l) Since there is no necessity of machining and finishing the stationary guide mounting surface (side surface) of the base plate 1 of FIG. 1, the manufacturing cost decreases.

(m) Since the height of the stationary guide 2 can be made low, use of a thinner member can retain sufficient rigidity.

According to the present invention, as described hereinbefore, the guide of the X stage and the Y stage in the vertical direction is provided by the base plate surface only, while the guiding of the Y stage in a lateral direction is provided by a single stationary guide mounted on the base plate. Also, the guiding of the X stage in a lateral direction is provided by a side surface of the Y stage. This effectively avoids moving load of the Y stage and assures complete blocking of transmission, to the X stage, of vibration of the Y stage such as that in the vertical direction, that in the X-axis direction and rolling. Additionally, any pitching of the Y stage is hardly transmitted to the X stage. Thus, the coupling is minimized and high-precision positioning is ensured.

Further, the guiding of the Y stage in the lateral direction only through a single stationary guide on the base plate assures that, irrespective of any difference in material property (thermal expansion coefficient) of the base plate and the stationary guide in comparison with the X stage and the Y stage, the bearing characteristic does not change at all and, for this reason, high-precision positioning is assured.

While the invention has been described with reference to the structures disclosed herein, it is not confined to the details set forth and this application is intended to cover such modifications or changes as may come within the purposes of the improvements or the scope of the following claims.

What is claimed is:

1. A motion guiding device, comprising:
   a base having a reference surface;
   a guide fixed to said base and having a first guiding surface extending in a first direction;
   a first stage having a first gas bearing disposed opposite to said reference surface of said base and a plurality of second gas bearings disposed opposite to said first guiding surface of said guide, wherein said guide is disposed at only one side of said first stage, wherein the motion of said first stage in the first direction is guided by said first guiding surface of said guide and said reference surface of said base and wherein said first stage has a second guiding surface extending in a second direction different from the first direction;

a second stage disposed so as to straddle said first stage, said second stage having a third gas bearing disposed opposite to said reference surface of said base and a fourth gas bearing disposed opposite to said second guiding surface, wherein motion of said second stage in the second direction is guided by said second guiding surface of said first stage and said reference surface of said base;

a first driving actuator actable on said first stage to move said first stage in the first direction, wherein said second stage moves in the first direction with said first stage through said fourth gas bearing;

a second driving actuator actable on said second stage to move said second stage in the second direction; and a magnet unit provided on said first stage and disposed opposite to said first guiding surface, for urging said first stage toward said guide, wherein said magnet unit is disposed between said second gas bearings with respect to the first direction.

2. A device according to claim 1, wherein a point of drive of said first driving actuator to said first stage substantially coincides with a center of gravity of the first and second stages, with respect to a direction perpendicular to said reference surface of said base.

3. A device according to claim 1, wherein said base includes recesses formed at opposite end portions thereof along said first direction.

4. A device according to claim 1, wherein said first and second stages are made of ceramics.

* * * * *

UNITED STATES PATENT AND TRADEMARK OFFICE
CERTIFICATE OF CORRECTION

PATENT NO. : 5,228,358
DATED : July 20, 1993
INVENTOR(S) : Sakino, et al.

It is certified that error appears in the above-indentified patent and that said Letters Patent is hereby corrected as shown below:

On the Title Page, Item [56]:

U.S. PATENT DOCUMENTS, "Duntee" should read --Dunfee--.

COLUMN 1:

Line 41, "all degrees" should read --all six degrees--.
Line 42, "six freedoms" should be deleted.

COLUMN 4:

Line 27, "6a-6e'" should read --6a'-6e'--.

Signed and Sealed this

Nineteenth Day of April, 1994

Attest:

BRUCE LEHMAN

Attesting Officer          Commissioner of Patents and Trademarks